No. 694,309. Patented Feb. 25, 1902.
L. A. BROTT.
PRODUCTION OF TYPE BARS.
(Application filed July 23, 1898.)
(No Model.)

Witnesses
Jos. C. Stack
Rufus N. Thayer

L. A. Brott
Inventor
by Walker A. Rogers,
attorney.

THE NORRIS PETERS CO., PHOTO-LITHO., WASHINGTON, D. C.

United States Patent Office.

LUCIEN A. BROTT, OF BROOKLYN, NEW YORK, ASSIGNOR TO THE COMPOSITE TYPE BAR COMPANY, OF JERSEY CITY, NEW JERSEY, A CORPORATION OF NEW JERSEY.

PRODUCTION OF TYPE-BARS.

SPECIFICATION forming part of Letters Patent No. 694,309, dated February 25, 1902.

Original application filed July 25, 1896, Serial No. 600,492. Divided and this application filed July 23, 1898. Serial No. 686,970. (No specimens.)

*To all whom it may concern:*

Be it known that I, LUCIEN A. BROTT, a citizen of the United States, residing at New York, (Brooklyn,) in the county of Kings and State of New York, have invented certain new and useful Improvements in Production of Type-Bars; and I do hereby declare the following to be a full, clear, and exact description of the invention, such as will enable others skilled in the art to which it appertains to make and use the same.

My invention relates to the typographic art. Its object is to produce a new type-bar; and to this end I have invented a method which consists, essentially, in binding together the units of a line of type by casting metal upon the shanks of the type, thereby at once adding the necessary spaces to the line and transforming the line into a bar.

Figure 1:
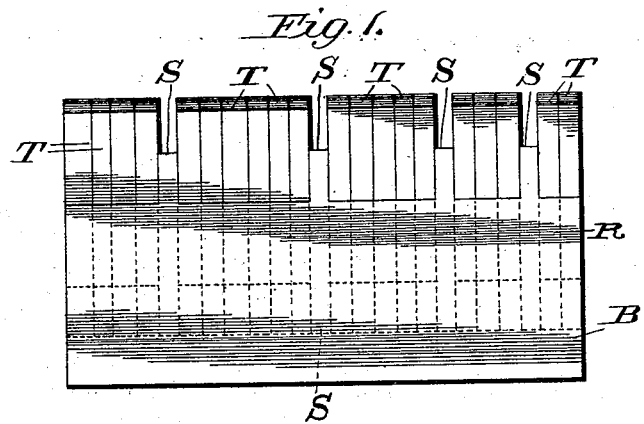
Figure 2:
Figure 3:
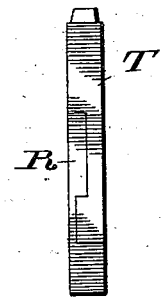
Figure 4:
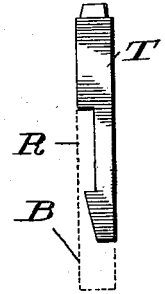

In the drawings accompanying this specification, Figure 1 is an elevation showing the relative positions of the types and the additional spaces, base, and filling or slug added to the line of type. Figs. 2, 3, and 4 illustrate the preferred forms of type which form elements of my bar, Fig. 3 being also, in effect, an end elevation of the bar.

T represents the form of type which I find especially adapted to constitute an element of my composite type-bar. This type has a character-head, a central recess, and a reduced shank, a modified form of the reduced shank being shown in Fig. 4, the side of the shank in that example being inclined between the foot of the type and the recess. It will be observed also that the type I show is shorter than the completed bar.

B is the metal base added to the line of type. S is the space placed between the word, and R is the metal placed in the recess and on the face of the types.

The product which I obtain by my method I have termed a "composite type-bar" to distinguish it from the common cast line of type and the common indented bar of type produced by matrix-machines. My bar comprises a series of separate units or types, which should bear carefully and separately formed characters. These units may be composed by hand or by machinery and may be likewise justified. After justification the units are locked together by molten metal, which is forced into the mold formed by the shanks of the units below the point at which the justifiers enter, the justifiers entering preferably near the heads of the types. The justifiers are then removed.

In the preferred form of bar which I have illustrated the units are shorter than the completed bar and have reduced shanks and central recesses. The line of types should be held in a form which will embrace the line and project beyond the feet of the types, so that the metal may not only flow between the shanks of the types, but may also form a continuous base below the feet of the types. The molten metal in running fuses the surface of the shanks of the types and tends to bind them together; but this binding is not relied upon. The locking of the metal in the recesses with the face of metal and the added base give absolute security.

In my preferred form the types are fused over as much surface as possible, the metal passes from between the shanks of the recesses at right angles across the type-line, the bases of the types rest against the solid backing or base, and the several types are also by reason of the reduced shanks strengthened by the metal along the side of the shanks, so that the added metal and the types are oppositely locked together in the best manner to successfully resist any strain.

Fig. 1 is intended to illustrate the character of both sides of my type-bar. On the recessed side the recess is defined by two lines where the cast metal turns in over the shoulders of the recess. Above these lines between the words projects for a short distance that part of the cast metal which represents the usual space in a line of type, while below the lines the metal is smooth to the base of the bar. On the other side, which may be termed the "back" of the bar, the point where the metal has turned in under the short type is defined by a line, (dotted in the view,) and from this line upward the alternating types and portions of metal representing spaces may be clearly distinguished—that is to say, the front of the bar when the casting is completed presents a smooth finish, marked by fine transverse lines defining the place of the recess and by fine vertical lines defining the place of the intervening spaces, while the back of the bar has the bottom addition defined by a transverse line and the several types and spaces defined by vertical lines.

My completed bar is distinguishable at a glance from any bar heretofore made in any way and is peculiarly marked as an advance in the typographic art by the fine type effect, all the types having in consequence of their careful and separate manufacture the full sharp shoulders so evident in a line of foundry-type and wanting in a cast line of type or a line produced by indentation. The bar is smooth and practically without projection or unevenness, while at the same time the eye can select the component parts of the bar, as indicated by the previous description of the bar, as illustrated by Fig. 1.

It will be observed that my invention connects the arts of type-setting and bar-making, relating more particularly to the latter, to which the product pertains. I secure all the well-known advantages of type-casting and type-setting mechanisms and at the same time the distinct advantages of a bar, and I also in one act provide any number of spaces to fit all the word-divisions, however irregular, and transform the line into a bar, having previously full control of the types for alinement and justification.

When the line is justified, no attention need be paid to the uniformity of justification, nor is any measurement of the justification or the divisions between the words required, the only limit to the justification being the fixed width of the retaining block or form. When the metal is forced into the openings, spaces are at once produced and applied, each space of course being precisely adapted to the opening it is to fill.

It is obvious that my method may be varied in practice and that the elements of the bar and the bar itself may be varied in form without departing from the principle of my invention.

I can carry out my method by old and well-known hand-tools; but the apparatus shown in my application, No. 600,492, filed July 25, 1896, of which this application is a division, is peculiarly adapted to carry out my method and produce my bar.

Having fully described my invention, what I desire to secure by Letters Patent is—

1. The method herein described of binding together a series of type units which consists in casting additional metal about the types, substantially as set forth.

2. The method herein described of locking together a series of types which consists in casting additional metal between the shanks of the types and upon the bases of the types, substantially as set forth.

3. The method of binding together the assembled units of a justified line of type which consists in casting additional metal into the mold formed by the separated shanks of the units, substantially as set forth.

4. The method herein described of forming composite type-bars which consists in assembling and justifying a line of type units and casting a backing of metal upon and between the shanks of the types, substantially as set forth.

5. The method herein described of producing type-bars which consists in assembling and justifying units of a line and flowing molten metal between and upon the type units, whereby the line is transformed into a bar, substantially as set forth.

6. The herein-described method of applying spaces to a line of type which consists in forcing molten metal between the types and permitting it to harden and form the spaces, substantially as set forth.

7. The method of forming a line of type which consists in assembling and justifying units of the line and then forcing molten metal between the divisions of the line and permitting the metal to harden and form the spaces, substantially as set forth.

In testimony whereof I have affixed my signature in presence of two witnesses.

LUCIEN A. BROTT.

Witnesses:
ALEX. LIDDELL,
WILLIAM H. SMITH.